United States Patent [19]
Scribner et al.

[11] Patent Number: 5,555,466
[45] Date of Patent: Sep. 10, 1996

[54] VEHICULAR AUDIO/VISUAL SYSTEM HAVING DISTRIBUTION BOX FOR CONNECTING INDIVIDUAL PASSENGER MONITORS TO MULTIPLE PROGRAM SOURCES

[75] Inventors: Paul Scribner, Elkhart, Ind.; Dan Semple, Glen Arbor, Mich.

[73] Assignee: ASA Electronics Corporation, Elkhart, Ind.

[21] Appl. No.: 320,970

[22] Filed: Oct. 12, 1994

[51] Int. Cl.⁶ .................................................. H04N 7/16
[52] U.S. Cl. ............................. 348/8; 348/706; 455/6.3
[58] Field of Search ................................. 348/706, 8, 6, 348/12, 7; 455/3.1, 6.3; 340/826, 827; H04N 7/16

[56]             References Cited

U.S. PATENT DOCUMENTS

| 4,562,535 | 12/1985 | Vincent et al. | 364/200 |
|---|---|---|---|
| 4,584,603 | 4/1986 | Harrison | 455/6.3 |
| 4,835,604 | 5/1989 | Kondo et al. | 348/8 |
| 5,034,808 | 7/1991 | Murray | 348/8 |
| 5,318,450 | 6/1994 | Carver | 348/8 |
| 5,402,419 | 3/1995 | Osakabe et al. | 348/8 |
| 5,414,417 | 5/1995 | Heo | 348/706 |

FOREIGN PATENT DOCUMENTS 63-219289  9/1988  Japan ..................... H04N 7/16

*Primary Examiner*—John K. Peng
*Assistant Examiner*—Jeffrey S. Murrell
*Attorney, Agent, or Firm*—Baker & Daniels

[57]             ABSTRACT

An audio-visual system for a motor vehicle includes multiple viewing/listening stations, one station for each passenger. Each station includes a video monitor mounted in the back of the seat immediately in front of the user and includes an audio headphone terminal in a control panel adjacent each viewing station. The control panel includes a multiple position switch, which is connected to a distribution box for switching between multiple program sources for transmission to each viewing station. Accordingly, the user at each viewing station can independently switch between the program sources.

15 Claims, 4 Drawing Sheets

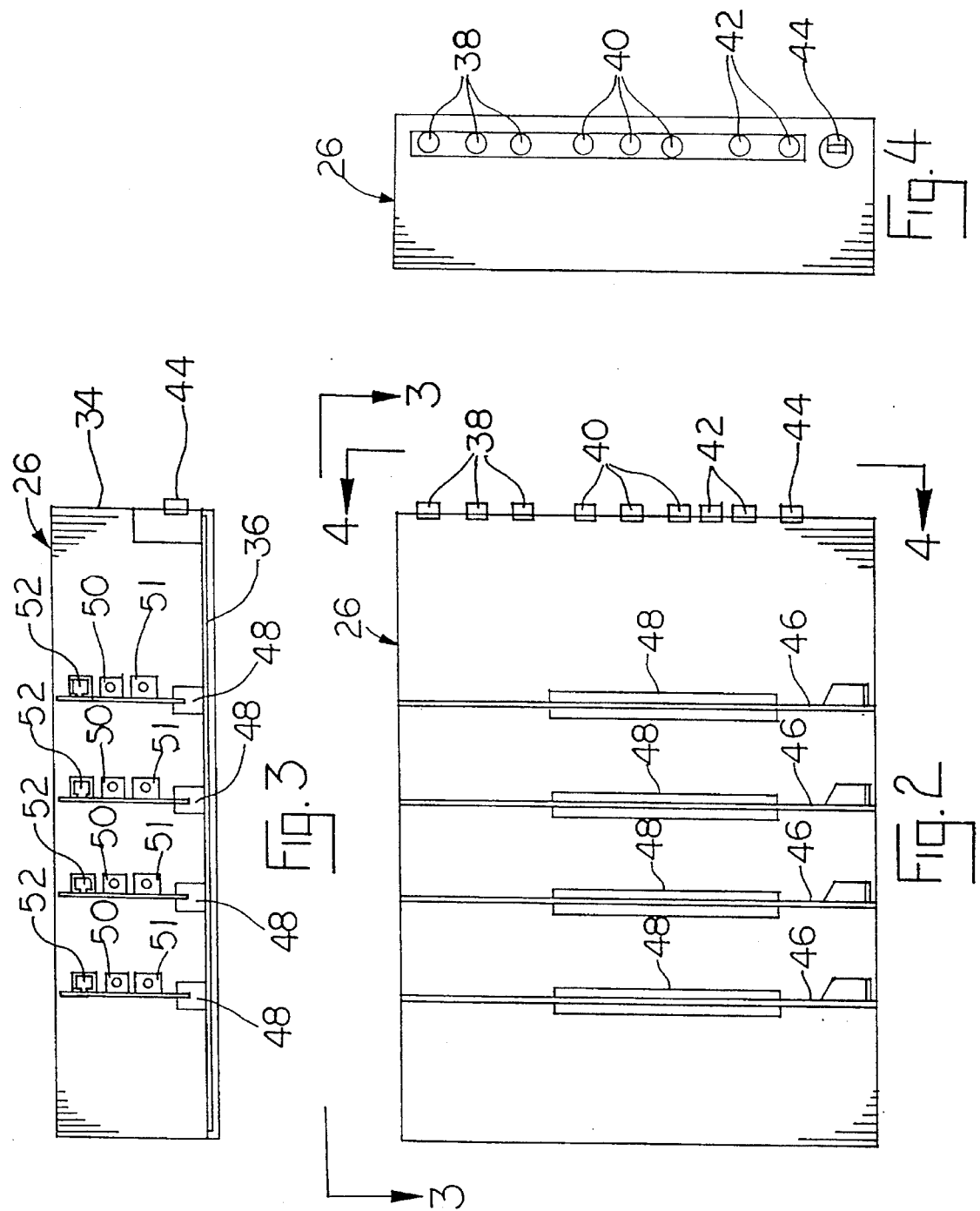

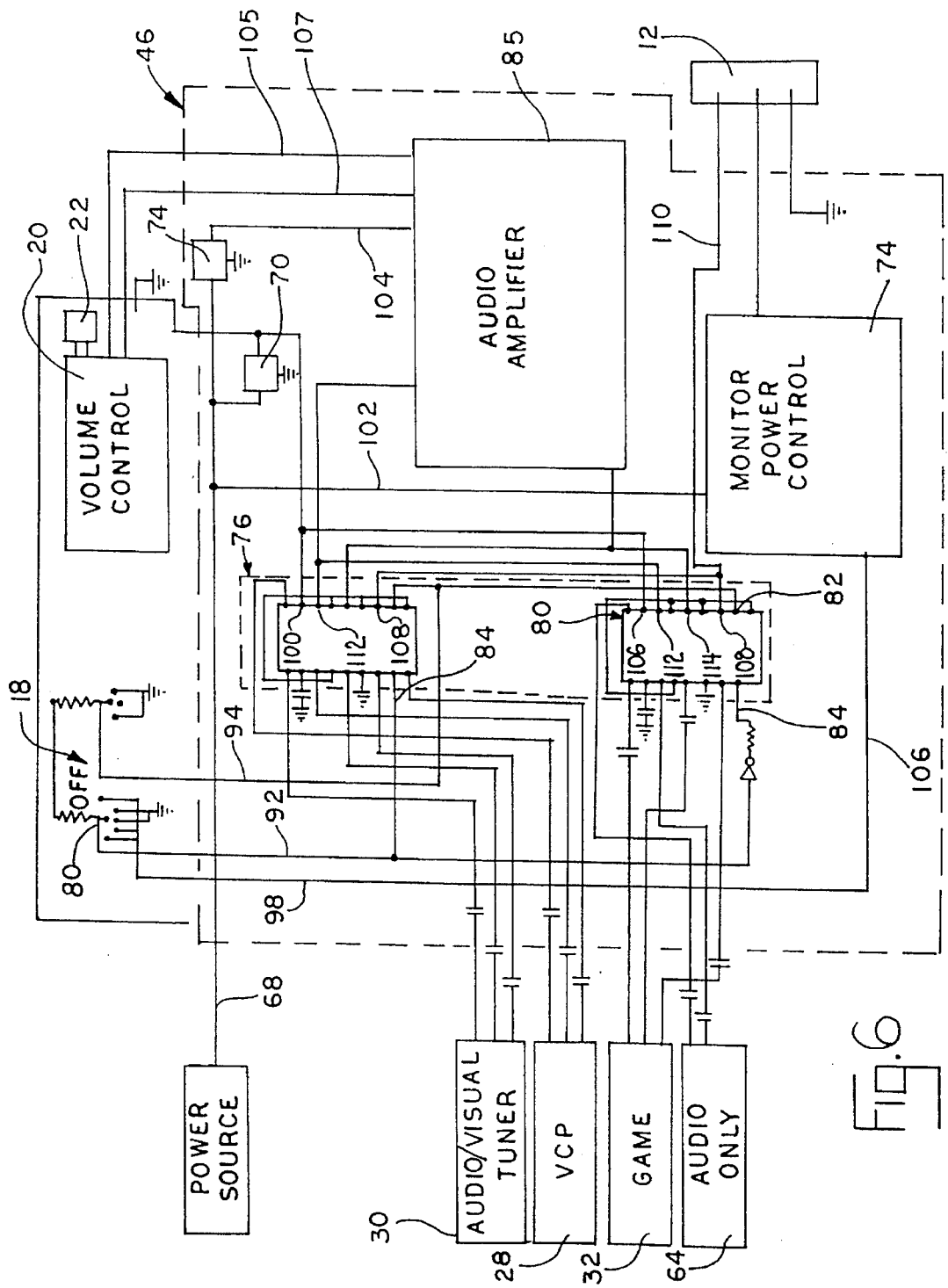

VEHICULAR AUDIO/VISUAL SYSTEM HAVING DISTRIBUTION BOX FOR CONNECTING INDIVIDUAL PASSENGER MONITORS TO MULTIPLE PROGRAM SOURCES

This invention relates to an audio/visual system having multiple viewing/listening stations.

Converted vans, recreational vehicles, and other similar automotive vehicles have become increasingly popular in recent years. Many of these vehicles are equipped with television receivers. However, installation of a television receiver in a converted van usually requires a "step-up" roof, in order to provide a mounting for the television in a location where it can be easily viewed by all of the passengers in the rear of the vehicle. Furthermore, existing systems require that all passengers in the vehicle view the same audio/visual program; for example, there is no provision in existing systems that permits one passenger to view a television program while another passenger views a video cassette or plays a video game. Furthermore, some passengers in the vehicle may desire to view the television, while other passengers may desire to listen to radio programs. Although primarily intended for converted vans and other similar recreational vehicles, systems according to the present invention may be used on other types of vehicles, such as intercity busses, trains, airplanes and passenger cars. While audio-visual systems have been used in other types of vehicles (such as aircraft) in the past, these prior systems usually involve complex multiplexing systems, which involve substantial cost and are not, accordingly, practical for normal passenger ground vehicles.

The present invention provides an audio-visual system for vehicles in which a video monitor, preferably of the LCD type, is mounted on the rear of the passenger seats or elsewhere for viewing by passengers sitting in the adjoining seat. A distribution box is mounted at a central location within the vehicle and has input jacks which are connected to various programming sources, such as a television tuner, monitor cameras, navigation systems, computer displays, video cassette players, video game devices, or audio receivers. Each viewing station within the vehicle is equipped with a control panel which includes a set of headphone jacks, a volume control, and a multiple position switch for switching between the program sources for display on the individual video monitors. In this way, each passenger seated in such a location to view the monitor is able to chose from multiple program sources, which are individually transmitted to the monitor which can be viewed by the passenger. Accordingly, one important advantage of the present invention is that each individual passenger seated in other than the front seats of the vehicle may chose between multiple program sources for individual viewing on a video monitor mounted on the back of the seat immediately in front of each such passenger. Another advantage of the present invention is that individual head phones are provided at each viewing station, so that programs viewed by one individual will not interfere with programs viewed by other passengers. Still another important advantage of the present invention is that audio/visual programs may be installed in a van or other vehicle of a normal height clearance. A still further important advantage of the present invention is to provide an audio/video distribution system for a vehicle at a relatively modest cost.

These and other advantages of the present invention will become apparent from the following specification, with reference to the accompanying drawings, in which:

FIG. 2 is a top plan view of the internal components of the distribution box (with the cover removed) illustrated in FIG. 1;

FIG. 3 is a view taken substantially along lines 3—3 of FIG. 2;

FIG. 4 is a view taken substantially along lines 4—4 of FIG. 2;

FIG. 6 is a diagrammatic illustration of the individual station cards used as a component within the distribution box used in the system of the present invention.

Figure 1:
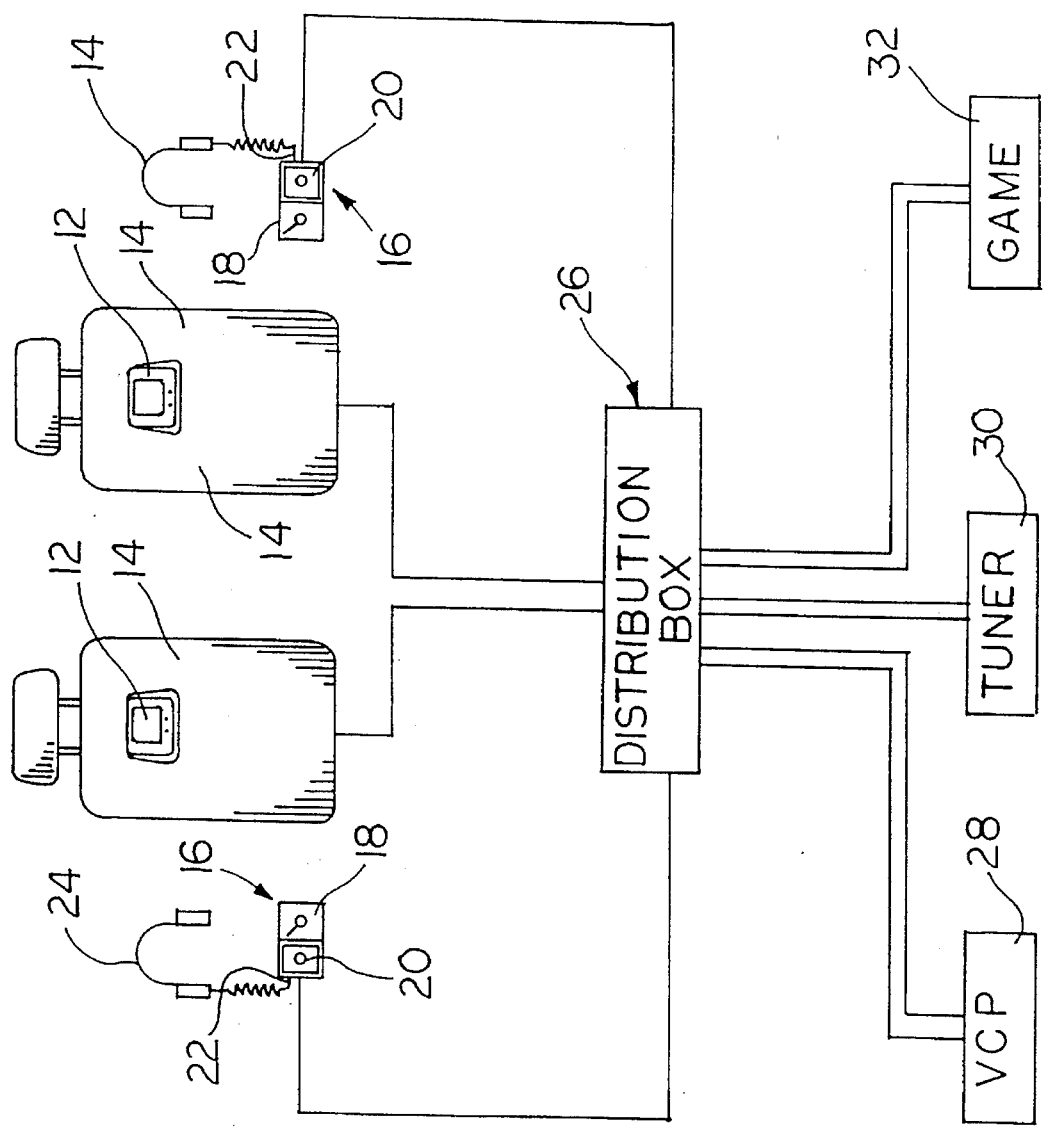
FIG. 1 is a diagrammatic illustration of an audio/visual system pursuant to the present invention installed in a motor vehicle.

Referring now to FIG. 1 of the drawings, a distribution system generally indicated by the numeral 10 includes video monitors 12 mounted on the back of vehicle seats 14 or other locations for viewing by the person seated directly in back of each vehicle seat 14. Accordingly, a monitor 12 is provided for each of the passengers in the vehicle sitting in such a location to see a monitor. Each viewing station of the distribution system 10 includes the video monitor 12 and a control panel generally indicated by the numeral 16. Each of the control panels 16 includes a multi-position switch 18, a volume control 20, and a jack 22 for installing headphones 24. Each of the video monitors 12 and the control panels 16 are connected to a distribution box generally indicated by the numeral 26. The distribution 26 is connected to various programming sources, such as an audio radio tuner (not shown in FIG. 1), a video cassette player 28, a tuner 30, and a video game player 32 (or to monitor cameras, navigation systems, or computer monitors). The distribution box 26, as will hereinafter be explained, is responsive to operation of the multiple position switches 18 to connect an appropriate programming source to the corresponding monitor 12 and headphones 24, as selected by the viewer by operating the multiple position switch 18.

Referring now to FIGS. 2–4, the distribution box 26 includes a cover 34 which encloses a mother board 36. The mother board 36 has longitudinally extending conductors, one of which is connected to a power supply as available in automotive vehicles. Additional conductors are connected to each of the jacks 38, which receive the three inputs from the game player 32 (left and right audio and video) jacks 40, which receive each of the three inputs of the video cassette player 28 (left and right audio and video) and jacks 42, which are connected to the tuner 30 (left and right audio and video). A multiple connector 44 includes connections for a power, provides a ground for the chassis, and carries the radio conductors for conducting radio signals into the distribution box 26. Station cards 46 for each of the viewing/listening stations are mounted vertically within the cover 34 and are supported by conventional carriers 48. There are five station cards illustrated in FIG. 2 for five stations, but it will be understood that the distribution box 26 may contain any number of station cards 46 as required. Furthermore, it is a well known technique to "daisy chain" distribution boxes together by providing jumper cards of conventional design. Of course, common recreational vehicles and converted vans will only require four or five stations, but other vehicles, such as busses, trains, airplanes, commuter vehicles, etc. . . . may require many more than five stations.

Each of the cards 46 can carry a power jack 50, which transmits power to the corresponding monitor, and a video jack 51, which transmits a video signal to the corresponding monitor 12. It is an important feature of the invention that the power is distributed to the monitors 12 through the distribution box 26. Accordingly, the system requires only one connection with the vehicle electrical system. Each of the cards 46 further include an eight circuit modular connector 52, which is connected to the control panel 16 at each of the viewing/listening stations. Each of the modular connectors 52 carry three logic circuits, each of which are connected to the multiple position switch 18 as will hereinafter be described, two audio circuits, for connection to the headphones 24 through jacks 22, one grounding circuit; one circuit carrying power to backlight the corresponding panel 16; and one circuit which allows the viewer to mute the video monitor 12, as will hereinafter be described.

Figure 5:
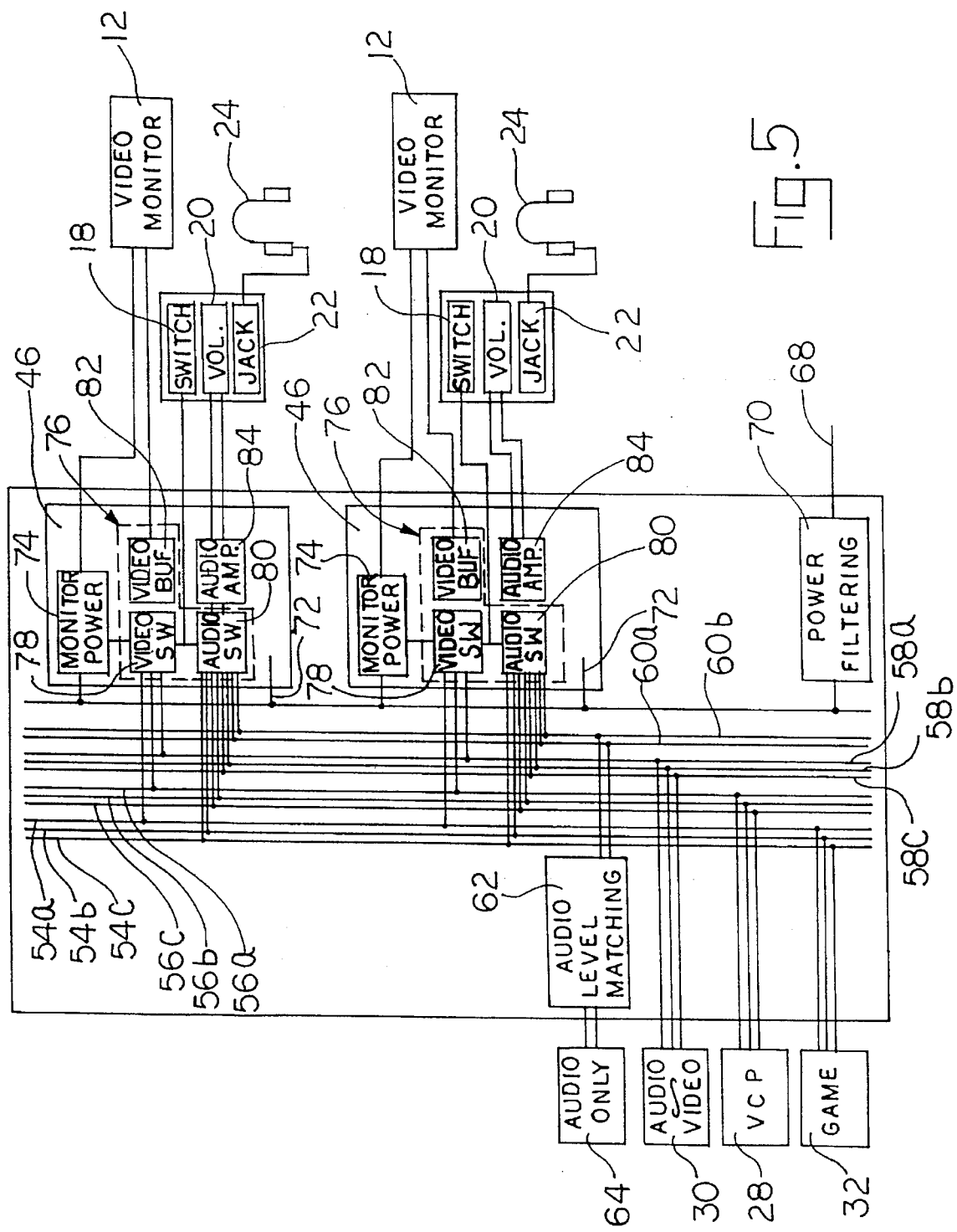
FIG. 5 is a diagrammatic illustration of the distribution box illustrated in FIG. 1.

Referring now to FIG. 5, which illustrates one possible system configuration, the mother board 36 of the distribution box 26 includes a first set of conductors 54A, 54B and 54C. Conductor 54A is connected to the video output of the game player 32, and conductors 54B and 54C are connected to the video outlets of the game player 32. Mother board 36 includes a second set of conductors 56A, 56B and 56C which are connected, respectively, to the video and audio outputs of the video cassette player 28; a third set of conductors 58A, 58B and 58C, which are connected respectively to the video and both audio output terminals of the tuner 30; and conductors 60A and 60B, which are connected through audio level matching circuit 62 to the radio tuner 64 of the vehicle. Mother board 36 further includes a power conductor 66 which is connected to a power source (such as the vehicle electrical system) as indicated at 68 through a filtering device 70 of conventional design. Each of the circuit cards 46 has a connection 72 to the power conductor 66 to supply power to the components of the station card 46. Each station card 46 further include a monitor power conditioner 74 which has an input connected to the conductor 66 and an output connected to the corresponding video monitor 12 for supplying electrical thereto. Station cards 46 further include an electronic circuit generally indicated by the numeral 76 which includes a video switch 78 connected to the conductors 54A, 56A and 58A, and audio switch 80, which is connected to the conductors 54B–C, 56B–C, 58B–C and 60A–B and a video buffer 82 which buffers an output signal which carries a video signal to the video monitor 12. Audio switch 80 with integrated circuit 76 is connected to audio amplifier 85, which sends the audio signal to volume control switch 20 and outputs to the headphone jacks 22 for connection to the headphones 24.

Referring now to FIG. 6, which illustrates schematically the details of the station card 46 and the control panel 16, but in more detail than that of FIG. 5, electronic circuit 76 consists of two integrated circuits 78, 80. Integrated circuits 78, 80 are conventional video switching circuits sold as model No. TDA8440 by Phillips Electronics BV. Each of the circuits 78, 80 is adapted for switching between two audio/video sources. As illustrated, the input terminals of the circuit 78 are connected to the audio-visual tuner 30 and the video cassette player 28 respectively. It will be noted that a total of six inputs, three for each program source to be switched, are provided for the integrated circuit 78. Similarly, the circuit 80 is adapted to switch between the game player 32 and the audio radio source 64, it being noted that the video terminal for the source 64 is not used. Each of the integrated circuits includes a switching port 82, which causes the corresponding circuit 78 or 80 to switch between the two sources connected to it. Accordingly, both integrated circuits 78, 80 respond to the presence or absence of a signal at ports 82 to effect switching. Both of the integrated circuits 78, 80 are provided with a trigger port 84, the signal transmitted to port 84 of integrated circuit 80 being inverted by invertor 86. Accordingly, since the trigger port 84 turns on the corresponding integrated circuit 78 or 80, when integrated circuit 78 is turned on, circuit 80 is turned off, and when there is an absence of a signal to port 84 of circuit 78, the invertor 86 causes a signal to be supplied to port 84, thereby turning integrated circuit 80 on.

The ports 82, 84 of the integrated circuits 78, 80 are controlled by the multiple position switch 18. Multiple position switch 18 is a double pole, five position switch (four active positions and one "off" position). Both of the poles illustrated schematically at 88 and 90 are controlled by the same knob, so that both poles are switched simultaneously from between the positions numbered 1–4 in the drawing. The pole 88 controls the trigger port 84 of both integrated circuits, and alternate ones of the positions 1–4 alternatively supply a signal on line 92 to the trigger ports 84. Accordingly, as the pole 88 is switched between the active positions 1–4, a signal is alternatively supplied and then terminated on line 92. Accordingly, since the signal to trigger port 84 of the integrated circuit 80 is inverted by invertor 86, the integrated 78 and 80 will alternatively be turned on and off as the pole 88 is switched. The pole 90 controls signal to the switching port 82 of the integrated circuit 78 and 80, which are connected to the pole 90 through line 94. Accordingly, the signal to the switching port 82 will alternatively be turned on and off as the pole 90 is switched between and active positions 1–4. Accordingly, switching between the four sources 28, 30, 32 and 64 is effected, since the output ports of the integrated circuits 78 and 80 are common. Although both of the integrated circuits 78 and 80 are switched at the same time by signals transmitted to the switching port 82, only one of the integrated circuits 78 or 80 will be turned on because only one will receive a signal at the trigger port 84. Power is supplied to both poles 88 and 90 of the switch 18 from the power supply line 68.

Power is supplied from the power source along line 68 to the power input ports 100 of the integrated circuits 78, 80. Power is also supplied to the power control 74 and the audio amplifier 85 from the power source along lines 68 and also along lines 102 and 104 respectively. Power is supplied from the monitor power control to the switch 18 through conductor 106. Power is also supplied from the monitor power control 74 to the monitor 12. Signals are supplied from audio amplifier 85 to volume control 20 through lines 105 and 107 and from the volume control 20 to the headphone jacks 22.

The video signal from the selected source 28 or 30 (in the case of integrated circuit 78) or from the game 32, if the game 32 is selected (in the case of the integrated circuit 80) is transmitted to the video output port 108 of the corresponding integrated 78 and 80 and is transmitted to the corresponding video monitor 12 on line 110. The audio signals from the selected source are transmitted to audio output ports 112, 114, which are connected to audio amplifier 85, such that the signals are amplified and transmitted to the headphone jacks 22.

Accordingly, as the knob controlling switch 18 is shifted from the off position to the "1" position, a signal is transmitted along line 92 to trigger port 84, thereby turning on the integrated circuit 78 and turning off integrated circuit 80. At the same time, a signal is transmitted to switching ports 82 of integrated circuit 78 and 80, since the integrated circuit 78 is the only one that is active, the corresponding input from video cassette player 28 or the tuner 30 will be selected from transmission to the video monitor 12 and headphone jacks 22. When the rotary switch is switched to the "2" position, the signal to switching ports 82 is terminated, while integrated circuit 78 is active and integrated circuit 80 is inactive, thereby switching to the other of the sources 28 or 30 for transmission to monitor 12 and headphone jacks 22.

When the switch is moved to the "3" position, the signal to trigger port 84 is terminated, thus turning off the integrated circuit 78 and turning on the integrated circuit 80, so that switching occurs between the game player 32 and the audio only output 64 as the switch is moved between the "3" and "4" positions. It will be noted of course, that similar switching takes place at each of the viewing stations corresponding to each of the station cards 46.

We claim:

1. Audio/visual system comprising multiple independent viewing/listening stations, each station including a video monitor and an audio headphone terminal, a distribution box having video and audio output terminals for each of said stations and multiple input terminals for connecting corresponding multiple program sources to said distribution box, and switch means for selectively connecting said program sources to said output terminals, said switch means including a selectively actuatable multiple position switch at each of said stations, each of said multiple position switches being connected to said distribution box and corresponding to a set of output terminals, and electronic switching means within said distribution box responsive to said multiple position switches for connecting corresponding input jacks selected by any of the multiple position switches with the output terminals corresponding thereto.

2. Audio/visual system as claimed in claim 1, wherein one of said input jacks is connected to a television tuner.

3. Audio/visual system as claimed in claim 1, wherein said switch means includes an electronic switch means within said distribution box, said electronic switch means including output ports connected to said output terminals, input ports connected to the input jacks, and control ports connected to the multiple position switches through control terminals.

4. Audio/visual system as claimed in claim 3, wherein said distribution box includes a mother board having corresponding conductors connected to a corresponding one of said input jacks, and a station card for each of said stations connected to said mother board, each of said station cards including said electronic switch means for a corresponding station.

5. Audio/visual system as claimed in claim 4, wherein said mother board includes multiple conductors, each of said conductors connecting with a corresponding one of said input terminals, each of said station cards including means for connecting the electronic switch means for its corresponding station to the conductors of the mother board and said output and control terminals for the station corresponding with the station card.

6. Audio/visual system as claimed in claim 4, wherein one of said conductors is a power conductor connected to a source of electrical energy, each of said station cards including means for controlling and transmitting power from said power conductor to the monitor for the station corresponding with the station card.

7. Audio/visual system as claimed in claim 3, wherein said multiple position switches are two pole rotary switches, each pole of said switches being separately connected to separate control ports of said electronic switch means.

8. Audio/visual system as claimed in claim 7, wherein said electronic switch means includes a pair of electronic switches for each of said stations, each of said electronic switches including said control ports for operating said switches, the control ports on each electronic switch including a switching control port and a trigger control port, the trigger control ports of both of said electronic switches being connected to one pole of the rotary switch for the corresponding station, the switching control ports of each of said electronic switches being connected to the other pole of said rotary switch for the corresponding station.

9. Audio/visual system as claimed in claim 8, wherein the input to the trigger control port of one of said pair of electronic switches for the corresponding station is inverted whereby only one of said pair of electronic switches of each station is triggered at any time.

10. Audio/visual system as claimed in claim 8, wherein said distribution box is connected to a source of electrical energy, and means for each of said station for conditioning and transmitting electrical energy from the distribution box to the video monitor of the corresponding station for powering said video monitor.

11. Audio/visual system as claimed in claim 8, wherein the electronic switches for each station are mounted on a station card for the corresponding station, all of the station cards being mounted within the distribution box, and means commonly connecting all of the station cards to the input terminals, said input terminals being common to all of said station cards.

12. Audio/visual system as claimed in claim 11, wherein the output terminals for each station are mounted on the station card for the corresponding station.

13. Audio/visual system as claimed in claim 1, wherein a pair of electronic switches for each of said stations are mounted within said distribution box, each of said electronic switches including control ports for operating said switches, the control ports on each electronic switch including a switching control port and a trigger control port, the trigger control ports of both of said electronic switches and the switching control ports of each of said electronic switches being connected to the multiple position switch for the corresponding station.

14. Audio/visual system as claimed in claim 1, wherein said system is used in a compartment having multiple seats, said video monitors for each of said stations being mounted immediately in the vicinity of user of the station and said multiple position switch and audio headphone terminals are located on a control panel mounted adjacent said seat.

15. Audio/visual system as claimed in claim 14, wherein said compartment is the passenger compartment of a ground motor vehicle.

* * * * *